United States Patent [19]

Baxter

[11] Patent Number: 4,505,748
[45] Date of Patent: Mar. 19, 1985

[54] ANTI-CORROSIVE PAINT

[75] Inventor: Kenneth F. Baxter, Sunderland, England

[73] Assignee: International Paint, London, England

[21] Appl. No.: 499,455

[22] Filed: May 31, 1983

[30] Foreign Application Priority Data

Nov. 10, 1982 [GB] United Kingdom ............... 8232097

[51] Int. Cl.³ .......................... C23F 11/00; C04B 31/02
[52] U.S. Cl. ............................. 106/14.39; 106/14.12;
106/292; 106/299; 106/301; 106/304; 106/306;
106/308 R; 106/287.34; 252/389.61; 524/121;
524/123; 148/6.15 R; 148/6.152
[58] Field of Search ............... 106/14.12, 14.21, 14.25,
106/14.33, 14.39, 292, 298, 301, 304, 306, 308
R, 287.34; 252/389.21, 389.2, 389.52, 389.53,
389.61; 148/6.15 R, 6.15 Z; 524/121, 124

[56] References Cited

U.S. PATENT DOCUMENTS

| 3,431,217 | 3/1969 | Hwa | 252/389 |
| 3,471,552 | 10/1969 | Budnick | 148/6.15 R |
| 3,483,133 | 12/1969 | Hatch et al. | 252/389 |
| 3,532,639 | 10/1970 | Hatch | 252/389 |
| 3,630,790 | 12/1969 | Schmidt | 148/6.15 R |
| 3,668,094 | 6/1972 | Hatch | 252/180 |
| 4,017,315 | 4/1977 | Vukasovich et al. | 106/14 |
| 4,020,091 | 4/1977 | Budnick | 260/429.7 |
| 4,217,216 | 8/1981 | Lipinski | 106/14.12 |
| 4,294,808 | 10/1981 | Wasel-Nielen et al. | 106/292 |

FOREIGN PATENT DOCUMENTS

| 1201334 | 8/1970 | United Kingdom . |
| 1261554 | 1/1972 | United Kingdom . |
| 1528717 | 10/1978 | United Kingdom . |
| 2041987 | 9/1980 | United Kingdom . |
| 2072648 | 3/1981 | United Kingdom . |

Primary Examiner—John Kight
Assistant Examiner—Garnette D. Draper

[57] ABSTRACT

An anti-corrosive coating composition includes an anti-corrosive pigment component comprising (a) a salt comprising a polyvalent metal cation and an organic polyphosphonic acid containing at least 2 phosphonic acid groups and (b) a corrosion passivator capable of modifying the metal oxide film on the metal to be protected to render it more protective. The ratio of the polyphosphonate salt (a) to the passivator (b) in the coating composition is 1:1 to 50:1 by weight.

19 Claims, No Drawings

ANTI-CORROSIVE PAINT

This invention relates to anti-corrosive coating compositions for use as a protective coating for metal surfaces, particularly on iron and steel to avoid rusting. Anti-corrosive coatings are, for example, applied to bridges, steel structures which are exposed to weather for long periods during the erection of buildings, car, aeroplane and other vehicle bodies and components, agricultural machinery, oil installations and exposed steel work on ships. An anti-corrosive coating (a "shop primer") may be applied to freshly blasted steel plate which is to be stored before use in construction or shipbuilding.

Anti-corrosive paint generally comprises a film-forming binder and one or more pigments. The pigments which have been regarded as most efficient in preventing corrosion are red lead and the chromates, particularly zinc chromate. Unfortunately both red lead and the chromates are now considered to be health hazards. Many anti-corrosive paints sold at present contain zinc phosphate as anti-corrosive pigment, but the performance of paints containing zinc phosphate has not been as good as those containing red lead or zinc chromate. The present invention seeks to provide a paint giving better protection of iron and steel from rusting than zinc phosphate paints and without using chemicals regarded as health hazards.

Many phosphates, phosphonates and polyphosphates have been used as corrosion and scale inhibitors in aqueous systems. Among these are hydroxy-ethylidene-1,1-diphosphonic acid, also known as etidronic acid, and its salts, whose use is described in British Pat. Nos. 1,201,334 and 1,261,554 and U.S. Pat. Nos. 3,431,217, 3,532,639 and 3,668,094, ethylene-1,1-diphosphonic acid described in British Pat. No. 1,261,554 and amino compounds substituted by two or more methylene phosphonic acid groups described in British Pat. No. 1,201,334 and U.S. Pat. No. 3,483,133.

An anti-corrosive coating composition according to the invention comprises a pigment component dispersed in a film-forming binder in which the pigment component comprises a salt comprising a polyvalent metal cation and an organic polyphosphonic acid containing at least two phosphonic acid groups and an inorganic corrosion passivator capable of modifying the metal oxide film on the metal to be protected to render it more protective, the ratio of the polyphosphonate salts to the passivator being 1:1 to 50:1 by weight.

The corrosion inhibition achieved by anti-corrosive paints has several effects, whose relative importance can differ for different uses of the paint. One effect is inhibiting the appearance of rust and the brown staining caused by rust. This is particularly important when the anti-corrosive paint is used as a primer to be covered by a paint whose main purpose is cosmetic. Another effect is inhibiting loss of metal by corrosion, which is particularly important when coating ships or industrial steel structures. A third effect is inhibiting the formation of corrosion products at the surface of the metal which would reduce the adhesion of subsequent coats of paint. This is particularly important for a shop primer. Paints according to the invention can be prepared which are substantially more effective than paints containing phosphates, such as the known anti-corrosive pigment zinc phosphate, in achieving one or all of these effects. The polyphosphonate salt and the passivator have a synergistic effect and give better corrosion inhibition when used in a paint together than either pigment used separately.

In general the molar ratio of polyvalent metal ions to phosphonate groups in the salt is at least $0.5/n:1$, where n is the valency of the metal ion; ratios of $0.8/n:1$ to $2/n:1$ are preferred.

One type of preferred polyphosphonate salt conforms to the general formula:

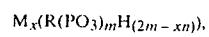

$$M_x(R(PO_3)_m H_{(2m-xn)}),$$

where M represents a metal ion selected from zinc, manganese, magnesium, calcium, barium, aluminium, cobalt, iron, strontium, tin, zirconium, nickel, cadmium and titanium, R represents an organic radical linked to the phosphonate groups by carbon-phosphorus bonds, m is the valency of the radical R and is at least 2, n is the valency of the metal ion M and x is from $0.8\ m/n$ to $2\ m/n$.

The valency m of the organic radical R is preferably 2 to 5. The polyphosphonate may be derived from a diphosphonic acid $R(PO_3H_2)_2$, for example a hydroxy-alkylidene-1,1-phosphonic acid of the formula:

$$\begin{array}{c} \mathrm{PO(OH)_2} \\ | \\ \mathrm{R'{-}C{-}OH} \\ | \\ \mathrm{PO(OH)_2} \end{array} \quad (I)$$

where R' is a monovalent organic radical, preferably an alkyl group having 1 to 12 carbon atoms.

The polyphosphonate salt is preferably an etidronate since etidronic acid has the most phosphonate groups per unit weight of the acids of formula (I) and is available commercially. The acids of formula (I) can be readily prepared by reacting a carboxylic acid R'COOH with phosphorus trichloride and hydrolysing the reaction product.

An alternative type of polyphosphonic acid is an amino compound containing at least two N-methylene-phosphonic acid groups. Such polyphosphonic acids can be prepared by the reaction of ammonia or an amine with formaldehyde and phosphorous acid. A diphosphonic acid of the formula:

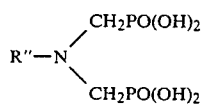

$$R''{-}N\begin{array}{c} {\diagup} \mathrm{CH_2PO(OH)_2} \\ {\diagdown} \mathrm{CH_2PO(OH)_2} \end{array}$$

where R" is a monovalent organic radical, preferably a substituted or unsubstituted alkyl group having 1 to 12 carbon atoms such as propyl, isopropyl, butyl, hexyl or 2-hydroxyethyl, can be prepared from a primary amine. An example of a tri-phosphonic acid $R(PO_3H_2)_3$ is aminotris(methylene-phosphonic acid) $N(CH_2PO(OH)_2)_3$ prepared from ammonia. Examples of tetra-phosphonic acids $R(PO_3H_2)_4$ are alkylene diamine tetra(methylene-phosphonic acids) of the general formula:

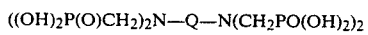

$$((OH)_2P(O)CH_2)_2N{-}Q{-}N(CH_2PO(OH)_2)_2$$

where Q is a divalent organic radical, preferably an alkylene group having 1 to 12 carbon atoms, for example ethylene diamine tetra(methylene-phosphonic acid)

or hexamethylene diamine tetra(methylene-phosphonic acid). An alternative form of tetraphosphonic acid is an alkylene bis(1-hydroxymethyl-diphosphonic acid) of the formula:

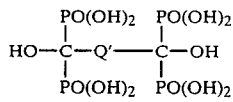

where Q' has the same definition as Q. Examples of pentaphosphonic acids $R(PO_3H_2)_5$ are dialkylene triamine penta(methylene-phosphonic acids), for example diethylene triamine penta(methylene-phosphonic acid) of the formula:

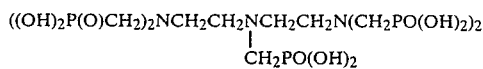

Polyphosphonic acids of higher functionality, including polymeric polyphosphonic acids, can be used, for example a polyethylene imine substituted by methylene phosphonic groups and having the formula:

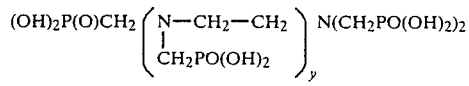

where y is at least 3.

The optimum ratio of polyvalent metal to acid in the salt may vary for different metals; for example a preferred calcium etidronate has a molar ratio of calcium to etidronate groups of about 1:1 (ratio of calcium to phosphonate groups 0.5:1). Zinc etidronate preferably has a molar ratio of zinc to etidronate of 1.2:1 to 2:1 (ratio of zinc to phosphonate groups 0.6:1 to 1:1). Manganese etidronate preferably has a manganese to etidronate molar ratio of 1:1 to 1.5:1 (ratio of manganese to phosphonate groups of 0.5:1 to 0.75:1). Within these ranges, salts having a lower polyvalent metal to acid ratio are generally most effective in preventing rust staining but the salts having a higher polyvalent metal to acid ratio allow least overall corrosion as assessed by absence of underfilm corrosion.

The complex polyphosphonate salt can be formed by reacting a basic compound of the desired metal M, for example an oxide, hydroxide or carbonate of zinc, manganese, magnesium, barium or calcium, with an organic polyphosphonic acid, for example etidronic acid, in the desired molar proportions.

The salt-forming reaction is preferably carried out in aqueous medium and the sparingly soluble salt is recovered as a precipitate. Examples of basic compounds are zinc oxide, calcium hydroxide and manganese carbonate. Mixtures of basic compounds, for example zinc oxide and calcium hydroxide, can be used to prepare a complex salt containing more than one metal M. An aqueous solution of organic polyphosphonic acid can be added to an aqueous slurry of the basic compound or vice versa. The slurry formed by the initial reaction of basic compound and acid of formula (I) may be heated, for example at 50°–100° C. for 10 minutes to 24 hours, to ensure completion of the salt-forming reaction. The precipitated salt is then separated and dried; it is preferably washed with water before drying to remove any highly water-soluble material, particularly unreacted polyphosphonic acid.

Alternatively a soluble salt of the metal M can be reacted with the polyphosphonic acid or a soluble salt thereof, but care must be taken to wash the product free of any ion (such as chloride) which might promote corrosion.

The crystalline state of the complex salt varies according to the nature of the metal M, the polyphosphonate anion and the ratio of metal ion to polyphosphonate. Some metals form salts of well-defined crystalline form, whose stoichiometry and crystalline form may vary according to their method of preparation. Calcium etidronate, for example, forms two types of crystals with a calcium to etidronate ratio of 1:1, and florets of very small plate-like crystals with a calcium to etidronate ratio of 2:1. When calcium hydroxide and etidronic acid are reacted in water at a molar ratio of 0.6:1–1.2:1 and at a temperature above 70° C. a precipitate of plate-like crystals of particle size below 50 microns is formed. When calcium hydroxide and etidronic acid are reacted at the same ratio in water at below 70° C. a precipitate of acicular crystals is formed. Both these crystal forms have been analysed as containing a molar ratio of calcium to etidronate between 0.9:1 and 1:1. The acicular crystals can be converted to the plate-like crystals by heating in water at above 70° C., for example for 30 minutes. Although both these calcium etidronates are particularly effective corrosion inhibitors when used in conjunction with a passivator, the plate-like crystals are preferred because of their lower solubility in water (generally below 0.5 grams per liter) and lower particle size. Other metals tend to form precipitated salts whose crystalline form is less well-defined and whose composition varies according to the ratio of metal and etidronate used in their manufacture, with no identifiable compounds of simple stoichiometry. Zinc etidronate, for example, prepared from zinc and etidronic acid in molar ratio 1.5:1 under varying reaction conditions forms mainly agglomerated acicular crystals of overall zinc to etidronate ratio above 1.3:1 up to 1.6:1.

The polyphosphonate salt may alternatively be overbased. The metal used in an overbased polyphosphonate salt is preferably a metal whose oxide is not markedly alkaline, for example zinc or manganese. For example an etidronate of a metal such as zinc may have a molar ratio of metal to acid up to 3:1. Such overbased salts may be of the general form

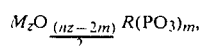

where M, R, m and n are defined as above and z is from 2 m/n to 3 m/n. They can be prepared by reacting an excess of a basic compound of the metal M, for example zinc oxide, with a polyphosphonic acid $R(PO_3)_m H_{2m}$, for example etidronic acid. In some cases overbased salts may be formed using an equivalent amount of basic metal compound and polyphosphonic acid. For example zinc oxide and etidronic acid reacted at a molar ratio of 2:1 can form an amorphous precipitate with a zinc to etidronate ratio in the range 2.3:1 to 2.7:1 together with fine plate-like crystals of zinc to etidronate ratio about 1.8:1. Both forms, or a mixture of them, are effective pigments in anti-corrosive paints.

The polyphosphonate salt can also contain cations from a strong base such as sodium, potassium, ammonium or substituted ammonium cations derived from amines, including quaternary ammonium cations, particularly when the metal M is present in less than a stoichiometric amount. These neutralise some or all of the excess acid groups in the salt so that the salt is less acidic in contact with water. Substitution of strong base cations for free acid groups generally increases the solubility of the salt. Such salts containing strong base cations may be of the general formula:

$$M_x M'_y R(PO_3)_m H_{(2m-xn-y)}$$

where M, R, n, m and x are defined as above, M' is an alkali metal or an ammonium or substituted ammonium ion and the value of y is such that $(xn+y)$ is from m to 2m. Salts of this type can be prepared by adding a strong base, for example sodium hydroxide, potassium hydroxide or a quaternary ammonium hydroxide such as tetrabutyl ammonium hydroxide to the slurry formed by reaction of a basic compound of polyvalent metal M with polyphosphonic acid $R(PO_3)_m H_{2m}$ or by reacting an aqueous solution of a partial alkali metal salt of a polyphosphonic acid of the general formula:

$$M'_y R(PO_3)_m H_{(2m-y)}$$

with the desired amount of the basic compound of metal M.

The invention includes coating compositions whose pigment component comprises salts containing both polyphosphonate anions and other anions, for example phosphate anions, formed for example by coprecipitation in addition to the passivator.

The invention also includes coating compositions whose pigment component, in addition to the passivator, comprises particles of a substantially water-insoluble compound of a polyvalent metal reacted with an organic polyphosphonic acid so that the particles have a surface layer of metal polyphosphonate although the core of the particles may be unchanged water-insoluble metal compound. Pigments of this type may, for example, be formed by reacting an organic polyphosphonic acid with an excess of a metal oxide. The product may consist at least partly of coated oxide particles rather than a true overbased polyphosphonate salt. The metal oxide can, for example, be zinc oxide, tin oxide, iron oxide or a form of alumina, silica or zirconia having a proportion of hydroxyl groups at the surface of each particle. The particles of the water-insoluble metal compound used to make pigments of this type should preferably be less than 100 microns diameter, most preferably 1–20 microns.

The aqueous solubility of the polyphosphonate salt used as pigment is preferably not more than 2 grams per liter, for example 0.01–2 grams per liter. The preferred solubility for the salt may vary according to the intended use of the coating composition. Salts used in paints which continuously or frequently come into contact with water, for example metal primers for marine use, preferably have a solubility less than 0.6 grams per liter, for example 0.02–0.1 grams per liter. The solubility of the salt is less critical when it is used in paints which contact water less frequently, for example paints for use on cars, aircraft or land-based steel structures.

The passivator can function without oxygen and is preferably capable of acting as an oxidising agent of the metal to be protected. Examples of passivators are molybdates, vanadates, tungstates, chromates, stannates, manganates, titanates, phosphomolybdates and phosphovanadates. The passivator is preferably a salt of a divalent metal, for example zinc, calcium, manganese, magnesium, barium or strontium or a salt containing cations from a strong base such as sodium, potassium, ammonium or substituted ammonium cations as well as cations from a divalent metal. The passivator can, for example, be zinc molybdate, sodium zinc molybdate, calcium molybdate, zinc vanadate, sodium zinc vanadate or zinc tungstate. Zinc chromate or potassium zinc chromate can be used, although it may be desired to have a chromate-free coating composition to avoid any possible health hazard. Molybdates and vanadates, particularly meta-vanadates, are preferred, particularly zinc molybdate, sodium zinc molybdate or zinc metavanadate. The passivator preferably contains zinc ions if the polyphosphonate salt does not. The passivator may be in the form of composite particles in which a molybdate or other passivator is precipitated on the surface of particles of a carrier pigment, for example sodium zinc molybdate may be in the form of a coating on a carrier pigment such as zinc oxide, titanium dioxide or talc as described in British Pat. No. 1,560,826. The passivator preferably has a solubility of less than 2 grams per liter, for example 0.02 to 1 gram per liter.

The polyphosphonate salt is generally used as 2 to 100 percent by weight of the total pigment in the paint, preferably as 5 to 50 percent by weight of the total pigment. The ratio of polyphosphonate salt to passivator in the pigment component of the paint is preferably 2:1 to 20:1 by weight, most preferably 4:1 to 10:1. Within the latter range increasing proportions of passivator such as a molybdate salt have an increasing effect in inhibiting corrosion but as the weight of molybdate salt increases beyond 25 percent based on the weight of the polyphosphonate salt, for example etidronate, there is no increase in corrosion inhibition. When the weight of molybdate increases beyond 50 percent based on the weight of etidronate the corrosion inhibition may become less. While we cannot fully explain this surprising synergistic effect we believe that the passivator catalyses the formation of a corrosion-inhibiting layer at the metal surface.

The film-forming binder for the anti-corrosive coating is preferably an organic polymer and can in general be any of those used in the paint industry, for example an alkyd resin, an epoxy resin, an oleoresin, a chlorinated rubber, a vinyl resin, for example polyvinyl butyral, a polyurethane, a polyester, an organic or inorganic silicate, a polyamide or an acrylic polymer. Two or more compatible film-forming organic polymers can be used in paint. An extender resin such as a hydrocarbon resin or a coal tar derivative can be present. We have found that the combination of polyphosphonate salt and passivator used according to the invention gives particularly improved corrosion protection compared to known anti-corrosive pigments such as zinc phosphate when used in alkyd resins, which are the most widely used binders for protective coatings, and also gives a marked improvement when used in epoxy resins.

The anti-corrosive coating composition of the invention can additionally contain a known anti-corrosive pigment such as a phosphate, for example zinc phosphate, silicate, borate, diethyldithiocarbamate or lignosulphonate or zinc dust or an organic anti-corrosive additive such as a tannin, oxazole, imidazole, triazole, lignin, phosphate ester or borate ester. Minor amounts of a basic pigment such as calcium carbonate or zinc oxide can be used, particularly if the polyphosphonate salt gives a pH less than 5 on contact with water. The calcium etidronates having a molar ratio of calcium to etidronate of about 1:1 generally give a pH of 4.5 to 5.1 on contact with water. Calcium etidronate with a molar ratio of calcium etidronate of about 2:1 gives an alkaline pH. Zinc etidronates having a molar ratio of zinc to etidronate of below about 1.4:1 generally give a pH of 3.5 or below. Zinc etidronates having a molar ratio of zinc to etidronate of above 1.6:1 generally give a pH of 6 to 7.

The coating composition of the invention can contain substantially inert pigments as well as the polyphosphonate salt and passivator, for example titanium dioxide, talc or barytes and optionally small amounts of coloured pigments such as phthalocyanines. The pigment volume concentration of the paint is preferably 20–50 percent depending upon the film-forming polymer used.

The coating compositions of the invention are most commonly used to prevent rusting of iron and steel but can also be used in anti-corrosive paints for metal surfaces other than iron, such as galvanised steel or aluminium, and can be used in pre-stressed concrete either to coat the stressing bars to prevent corrosion or as an exterior coating for the concrete to prevent rust staining.

The anti-corrosive coating is most usually applied to a metal surface by spray, roller or brush using as vehicle an organic solvent in which the film-forming binder is dissolved or dispersed. The coating may harden by evaporation of solvent, by air drying and/or by a cross-linking mechanism depending on the nature of the binder. The coating can alternatively be applied from an aqueous dispersion, in which case it can be applied by spray, roller or brush or by electro-deposition using a film-forming binder which is an anionic or cationic resin. Alternatively the coating composition can be applied as a powder coating, for example by electrostatic spray, and fused and cured on the metal surface.

The invention is illustrated by the following Examples:

PREPARATION OF POLYPHOSPHONATE SALTS

Preparation 1

184.8 grams (2.28 moles) zinc oxide was slurried at 20 percent by weight in water and heated to 70° C. An aqueous solution containing 316 grams (1.52 moles) etidronic acid was diluted to 20 percent by weight and heated to 70° C. The zinc oxide slurry was pumped into the etidronic acid solution over 45 minutes with continuous stirring of both the slurry and the solution. A precipitate formed after the addition of about 20 percent of the zinc oxide. The slurry formed was stirred for 4 hours at 60°–70° C. to allow the salt-forming reaction to take place. The slurry was then cooled and filtered on a Buchner funnel. The solid obtained was washed 4 times with distilled water using 2 liters of water each time to wash the salt free of etidronic acid. The wet filter cake was broken up and oven dried at 110° C. to obtain about 500 grams of zinc etidronate as a white solid with needle-like crystals. The solubility of the zinc etidronate was measured by slurrying it in distilled water, centrifuging and measuring the dissolved metal ion content. The metal ion content was 0.165 grams per liter, indicating a pigment solubility of 0.5 grams per liter.

Preparation 2

Manganous carbonate (87.0 grams, 0.75 moles) was reacted with etidronic acid (154.0 grams, 0.75 moles) using the same procedure as in Preparation 1 to prepare manganese etidronate as a pink solid.

Preparation 3

Calcium hydroxide (0.84 moles) was reacted with etidronic acid (1 mole) using the procedure of Preparation 1 to prepare calcium etidronate in the form of plate-like crystals.

EXAMPLE 1

Zinc etidronate prepared as described in Preparation 1 above was ball milled with the following ingredients to form an anti-corrosive paint in which the particle size of the zinc etidronate was 30 to 40 microns:

|  | Parts by Weight |
| --- | --- |
| Alkyd resin | 20.0 |
| Zinc etidronate | 16.3 |
| Sodium zinc molybdate | 4.0 |
| Talc | 13.5 |
| Titanium dioxide | 9.6 |
| Dryers and additives | 2.4 |
| Xylene solvent | 38.2 |

EXAMPLES 2 AND 3

Anti-corrosive paints were prepared as described in Example 1 but using in Example 2 the manganese etidronate prepared in Preparation 2 and in Example 3 the calcium etidronate prepared in Preparation 3. In each of these examples all of the zinc etidronate was replaced by an equal weight of the manganese or calcium etidronate.

EXAMPLE 4

An anti-corrosive paint was prepared according to Example 3 but increasing the amount of sodium zinc molybdate to 8.0 parts by weight.

EXAMPLE 5

An anti-corrosive paint was prepared according to Example 3 but decreasing the amount of sodium zinc molybdate to 2.0 parts by weight.

The anti-corrosive paints of each of Examples 1 to 5 were sprayed onto mild steel panels at a dry film thickness of 100 to 200 microns. When the paint film was dry two scribes were scratched through the paint film to reveal the underlying steel in the form of a cross. The panels were then subjected to 1,200 hours salt spray test as specified in British Standard BS 3900. The panels were assessed after testing for resistance to rust staining and blistering both generally and at the scribe.

Comparative tests were carried out in which the paint had the composition of Example 3 but with the sodium zinc molybdate omitted (Comparative Example X); the composition of Example 3 but with the calcium etidronate replaced by an equal weight of sodium zinc molybdate (Comparative Example Y) or the composition of Example 3 but with the calcium etidronate and sodium zinc molybdate replaced by zinc phosphate (Comparative Example Z). The results are shown below:

Example 1: very little rust staining, no blistering and no evidence of corrosion extending more than 1 mm from the scribe.

Example 2: results as for Example 1.

Example 3: substantially no rust staining (even less than Examples 1 and 2), no blistering and no evidence of corrosion extending away from the scribe.

Example 4: little rust staining (but slightly more than Examples 1 and 2), no blistering and no evidence of corrosion extending more than 1 mm away from the scribe.

Example 5: results as for Example 3.

Comparative Example X: very little rust staining (no more than Example 1) but some blistering around the scribe.

Comparative Example Y: rather more rust staining than Examples 1 to 5 and some corrosion extending more than 1 mm from the scribe.

Comparative Example Z: more rust staining than Example Y and some corrosion extending more than 1 mm from the scribe.

The results show that the paints according to Examples 1 to 5 containing an etidronate and a molybdate passivator gave better resistance to corrosion of the steel panel than paints containing an etidronate alone or sodium zinc molybdate alone or zinc phosphate. Some of the panels painted according to Examples 1 to 5 and comparative Example Z were also exposed to natural weathering in a severe marine environment at Coquet Island, a small island off the coast of Northumberland, England. After nine months the panels coated with the paints of Examples 1 to 5 showed very little rust staining and no creep of corrosion from the scribe; Examples 2, 3 and 5 in particular showed substantially no rust staining around the scribe. Comparative Example Z showed some rusting around the scribe and creep of corrosion from the scribe.

EXAMPLE 6

1,177 grams calcium hydroxide was slurried in 4,695 grams water and the slurry was added at 130.5 grams per minute to a stirred solution of 3,913 grams etidronic acid in 15.55 Kg water in the temperature range 65°–78° C. A mass of matted needles was precipitated after 30 minutes and addition of the slurry was interrupted while these were dispersed and re-dissolved in the solution. As addition of the slurry was continued a precipitate of plate-like calcium etidronate crystals was formed. These were filtered, water washed and dried in a fluid bed dryer. Analysis of the product indicated a molar ratio of calcium to etidronate of 0.94:1.

EXAMPLE 7

605 grams of a 60 percent aqueous solution of etidronic acid was added over 100 minutes to a stirred slurry of 107.4 grams calcium hydroxide in 2 liters distilled water kept in the temperature range 20°–35° C. A precipitate of acicular crystals was formed. These were filtered, water washed and dried in a fluid bed dryer. Analysis of the product indicated a molar ratio of calcium to etidronate of 0.94:1.

Anti-corrosive paints were made by ball milling the following ingredients:

|  | Parts by Weight | |
|---|---|---|
|  | Example 6 | Example 7 |
| Short oil alkyd resin | 20.0 | 20.0 |
| Calcium etidronate plate-like crystals | 16.3 | — |
| Calcium etidronate acicular crystals | — | 16.3 |
| Sodium zinc molybdate precipitated onto zinc oxide | 2.0 | 2.0 |
| Talc | 13.5 | 13.5 |
| Titanium dioxide | 9.6 | 9.6 |
| Driers and additives | 2.4 | 2.4 |
| Xylene solvent | 38.2 | 38.2 |

The anti-corrosive paints of Examples 6 and 7 were sprayed onto mild steel panels at a dry film thickness of about 100 microns. When the paint film was dry two scribes were scratched through the paint film to reveal the underlying steel in the form of a cross.

The coated panels were subjected to a salt spray test carried out at 90° C. as specified in ASTM-B117.

After 250 hours in the hot salt spray test, the paints of Examples 6 to 7 showed virtually no corrosion or blistering at the scribe and none in the intact areas of the film. Both paints were better in all respects than the zinc phosphate comparison paint.

After 500 hours in the hot salt spray test, the paint of Example 7 showed some corrosion and blistering at the scribe and had as much corrosion as the comparison paint. The paint of Example 6 still showed very little corrosion or blistering, even at the scribe and was markedly superior to the comparison paint.

EXAMPLES 6A AND 7A

Paints were prepared according to Examples 6 and 7 except that the amount of sodium zinc molybdate precipitated onto zinc oxide was increased to 4.0 parts by weight. The paints were sprayed on mild steel panels at 100 microns thickness and scribed and then subjected to a weathering test at Coquet Island with a comparison panel painted with a zinc phosphate paint. After ten months the paints of Examples 6A and 7A showed very little rusting even at the scribe and were superior to the comparison, which showed some creep of corrosion from the scribe.

Preparations 4 to 12

400 grams of a 50 percent by weight solution of amino tri(methylene phosphonic acid) was diluted with distilled water to give a 20 percent by weight solution and heated to 75°–80° C. A 20 percent by weight slurry of 99.0 grams calcium hydroxide in distilled water was heated to 75°–80° C. and added to the phosphonic acid solution over 45 minutes with continual stirring. The molar ratio of calcium hydroxide to amino tri(methylene phosphonic acid) was 2:1 (ratio of calcium to phosphonic groups 0.67:1). Following complete addition of the slurry, the solution and the resultant precipitate was held at temperature and stirred for a further two hours. The precipitate was isolated and dried.

Calcium and zinc salts of various organic polyphosphonic acids were made by the procedure of Preparation 4 as set out in the following Table:

TABLE

| Preparation No. | Type of Polyphosphonic Acid | Weight of Polyphosphonic acid | Weight of Ca(OH)$_2$ | Weight of ZnO | Molar Ratio of Ca or Zn to poly-phosphonic acid | Ratio of Ca or Zn to phosphonic Groups |
| --- | --- | --- | --- | --- | --- | --- |
| 5 | Amino tri (methylene phosphonic acid) | 58.5 g | 41.7 g | — | 2.88:1 | 0.96:1 |
| 6 | Amino tri (methylene phosphonic acid) | 95.5 g | — | 48.6 g | 1.88:1 | 0.63:1 |
| 7 | Amino tri (methylene phosphonic acid) | 81.0 g | — | 68.0 g | 3.10:1 | 1.03:1 |
| 8 | Ethylene diamine tetra (methylene phosphonic acid) | 81.8 g | 50.0 g | — | 4.0:1 | 1.00:1 |
| 9 | Ethylene diamine tetra (methylene phosphonic acid) | 81.8 g | — | 54.7 g | 4.0:1 | 1.00:1 |
| 10 | Hexamethylene diamine tetra (methylene phosphonic acid | 92.3 g | 53.9 g | — | 4.0:1 | 1.00:1 |
| 11 | Hexamethylene diamine tetra (methylene phosphonic acid | 92.3 g | — | 59.0 g | 4.0:1 | 1.00:1 |
| 12 | Diethylenetriamine penta (methylene phosphonic acid | 172.6 g | — | 66.5 g | 5.45:1 | 1.09:1 |

EXAMPLES 8 TO 16

Each of the polyphosphonate salts prepared in Preparations 4 to 12, used in place of zinc etidronate in the paint formulation of Example 1, gives a paint of anti-corrosive properties at least as good as those of the paint of Example 1.

EXAMPLE 17

1 mole sodium hydroxide was added to 1 mole etidronic acid in aqueous solution to provide a 20 percent by weight solution. 1 mole of an aqueous slurry of calcium hydroxide was added over 30 minutes to produce a precipitate of a calcium sodium etidronate which was filtered, washed and dried. This polyphosphonate salt, used in place of calcium etidronate in the paint formulation of Example 3, gives a paint of equal anti-corrosive properties.

EXAMPLE 18

A fast air-drying industrial primer of a type used for example as a primer coating for agricultural impliments was prepared by ball milling the following ingredients:

| | Percent by Weight |
| --- | --- |
| Drying oil alkyd | 50.23 |
| Calcium etidronate as prepared in Example 6 | 12.40 |
| Sodium zinc molybdate | 1.55 |
| Inert pigments and fillers (calcium carbonate, titanium dioxide, talc, and yellow iron oxide) | 20.07 |
| Drier and additives | 2.39 |
| Xylene solvent | 13.36 |

The paint was applied to phosphated steel panels and was scribed as described in Example 1. The panels were then subjected to 240 hours salt spray test using the conditions of ASTM B-117. As a comparison a paint was used having the same ingredients apart from the calcium etidronate and sodium zinc molybdate and using zinc chromate (16 percent by weight of the pigment) as the anti-corrosive pigment.

The panels coated with the paint of Example 18 showed hardly any evidence of corrosion after the salt spray test even at the scribe and were equal to or better than the paint containing zinc chromate both in respect of overall appearance and of absence of rusting at the scribe.

EXAMPLE 19

An automotive surfacer/primer designed to be applied to phosphated steel and to take an acrylic top coat was prepared from the following ingredients:

| | Parts by Weight |
| --- | --- |
| Sodium zinc molybdate | 1.32 |
| Calcium etidronate as prepared in Example 6 | 12.68 |
| Inert pigments (Barytes, China clay, titanium dioxide and Yellow Iron Oxide) | 22.64 |
| Bentonite gel 10% | 2.57 |
| Carbon black predispersion 10% | 4.93 |
| Tall oil epoxy ester resin | 20.94 |
| Urea formaldehyde resin | 1.37 |
| Benzoguanamine resin | 2.13 |
| Driers and additives | 1.24 |
| n-butanol | 0.69 |
| Ethyl glycol monoethyl ether | 0.69 |
| Xylene | 28.80 |

The pigments, bentonite gel and black dispersion were dispersed in the epoxy ester resin. Xylene was added to the dispersion and it was passed through a sand mill to achieve Hegmann reading 7. The remaining ingredients were added with stirring.

The paint was sprayed on phosphated steel panels to give dry film thickness of 30–40 microns and was cured at 163° C. for 20 minutes. The panels were scribed and were subjected to 300 hours salt spray according to ASTM B-117, in conjunction with a comparison using zinc phosphate in place of the calcium etidronate and sodium zinc molybdate. The panels painted according to the invention showed no corrosion on the intact face area and a little corrosion around the scribe and were considerably less corroded than the comparison panels in both areas.

What is claimed is:

1. An anti-corrosive coating composition for a metal substrate comprising a pigment component dispersed in a film-forming binder, in which the pigment component comprises (a) a salt comprising a polyvalent metal cation and an organic polyphosphonic acid containing at least two phosphonic acid groups and (b) a corrosion passivator capable of modifying the metal oxide film on the metal substrate to be protected to render it more protective, in which both the polyphosphonate salt (a) and the corrosion passivator (b) have a solubility of less than two grams per liter and the ratio of the polyphosphonate salt (a) to the passivator (b) is 1:1 to 50:1 by weight, and the film-forming binder is selected from a group consisting of alkyd resin, epoxy resin, oleoresin, chlorinated rubber, vinyl resin, polyurethane, polyester, organic silicate, inorganic silicate, polyamide and acrylic polymer.

2. An anti-corrosive coating composition according to claim 1 in which the polyphosphonate salt has the general formula $M_xR(PO_3)_mH_{(2m-xn)}$, where M represents a metal ion selected from zinc, manganese, magnesium, calcium, barium, aluminium, cobalt, iron, strontium, tin, zirconium, nickel, cadmium and titanium, R represents an organic radical linked to the phosphonate groups by carbon-phosphorus bonds, m is the valency of the radical R and is at least 2, n is the valency of the metal ion M and x is from 0.8 m/n to 2 m/n.

3. An anti-corrosive coating composition according to claim 2 in which the polyphosphonate salt is a salt of a diphosphonic acid of the formula:

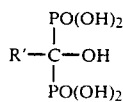

where R' is a monovalent organic radical.

4. An anti-corrosive coating composition according to claim 3 in which the polyphosphonate salt is a salt of etidronic acid.

5. An anti-corrosive coating composition according to claim 2 in which the polyphosphonate salt is a salt of an amino compound containing at least two N-methylenephosphonic acid groups.

6. An anti-corrosive coating composition according to claim 1 in which the polyphosphonate salt is a calcium salt.

7. An anti-corrosive coating composition according to claim 6 in which the molar ratio of calcium to phosphonate groups is 0.4:1 to 0.6:1.

8. An anti-corrosive coating composition according to claim 7 in which the polyphosphonate salt is a calcium etidronate having a molar ratio of calcium to etidronate groups of about 1:1 and being predominantly in the form of plate-like crystals.

9. An anti-corrosive coating composition according to claim 1 in which the polyphosphonate salt is a zinc salt.

10. An anti-corrosive coating composition according to claim 1 in which the polyphosphonate salt is a manganese salt.

11. An anti-corrosive coating composition according to claim 1 in which the polyphosphonate salt has the general formula:

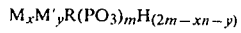

where M, R, n, m and x are all as defined in claim 2, M' is an alkali metal ion or an ammonium or substituted ammonium ion, and the value of y is such that (xn+y) is from m to 2m.

12. An anti-corrosive coating composition according to claim 1 in which the passivator is a molybdate, tungstate, vanadate, stannate, manganate, titanate, phosphomolybdate or phosphovanadate containing cations from a divalent metal.

13. An anti-corrosive coating composition according to claim 12 in which the passivator also contains alkali metal, ammonium or substituted ammonium cation.

14. An anti-corrosive coating composition according to claim 1 in which the passivator is a molybdate.

15. An anti-corrosive coating composition according to claim 14 in which the passivator is sodium zinc molybdate.

16. An anti-corrosive coating composition according to claim 14 in which the passivator is zinc molybdate.

17. An anti-corrosive coating composition according to claim 14 in which the passivator is in the form of composite particles formed by precipitating a molybdate of a polyvalent metal on the surface of particles of a carrier pigment.

18. An anti-corrosive coating composition according to claim 1 in which the passivator is a vanadate.

19. An anti-corrosive coating composition according to claim 1 in which the ratio of the polyphosphonate salt to the passivator is 4:1 to 10:1 by weight.

* * * * *